United States Patent [19]

Ishiguro et al.

[11] Patent Number: 4,783,784
[45] Date of Patent: Nov. 8, 1988

[54] MAGNETIC TAPE SYSTEM WITH WRITE RETRY MEANS

[75] Inventors: Masayuki Ishiguro, Kawasaki; Noboru Owa, Yokohama, both of Japan

[73] Assignee: Fujitsu Limited, Kawasaki, Japan

[21] Appl. No.: 883,755

[22] Filed: Jul. 9, 1986

[30] Foreign Application Priority Data

Jul. 12, 1985 [JP] Japan .................. 60-153832

[51] Int. Cl.$^4$ ............................. G06F 11/10
[52] U.S. Cl. ......................... 371/13; 371/38
[58] Field of Search ............ 371/38, 13, 32, 37; 360/53

[56] References Cited

U.S. PATENT DOCUMENTS

| | | | |
|---|---|---|---|
| 3,456,239 | 7/1969 | Glasson | 371/32 |
| 3,473,150 | 10/1969 | McClelland | 371/32 |
| 4,555,784 | 11/1985 | Wood | 371/38 |
| 4,597,083 | 6/1986 | Stenerson | 371/38 |
| 4,637,023 | 1/1987 | Lounsbury | 371/38 |
| 4,680,763 | 7/1987 | Suma | 371/38 |

Primary Examiner—Michael R. Fleming
Attorney, Agent, or Firm—Staas & Halsey

[57] ABSTRACT

Disclosed is a magnetic tape system of the type where when a write error is caused by writing data in a magnetic tape by a magnetic head, the write error is processed according to the variable length erase method. In this magnetic tape system, when a write error occurs, a write retry operation is executed, and lengths of blocks erased by the write retry operation are integrated. When the integrated length exceeds a predetermined value, a tape error is reported, and information of a long IBG having a length exceeding the length specified by the ISO standard is prevented.

9 Claims, 8 Drawing Sheets

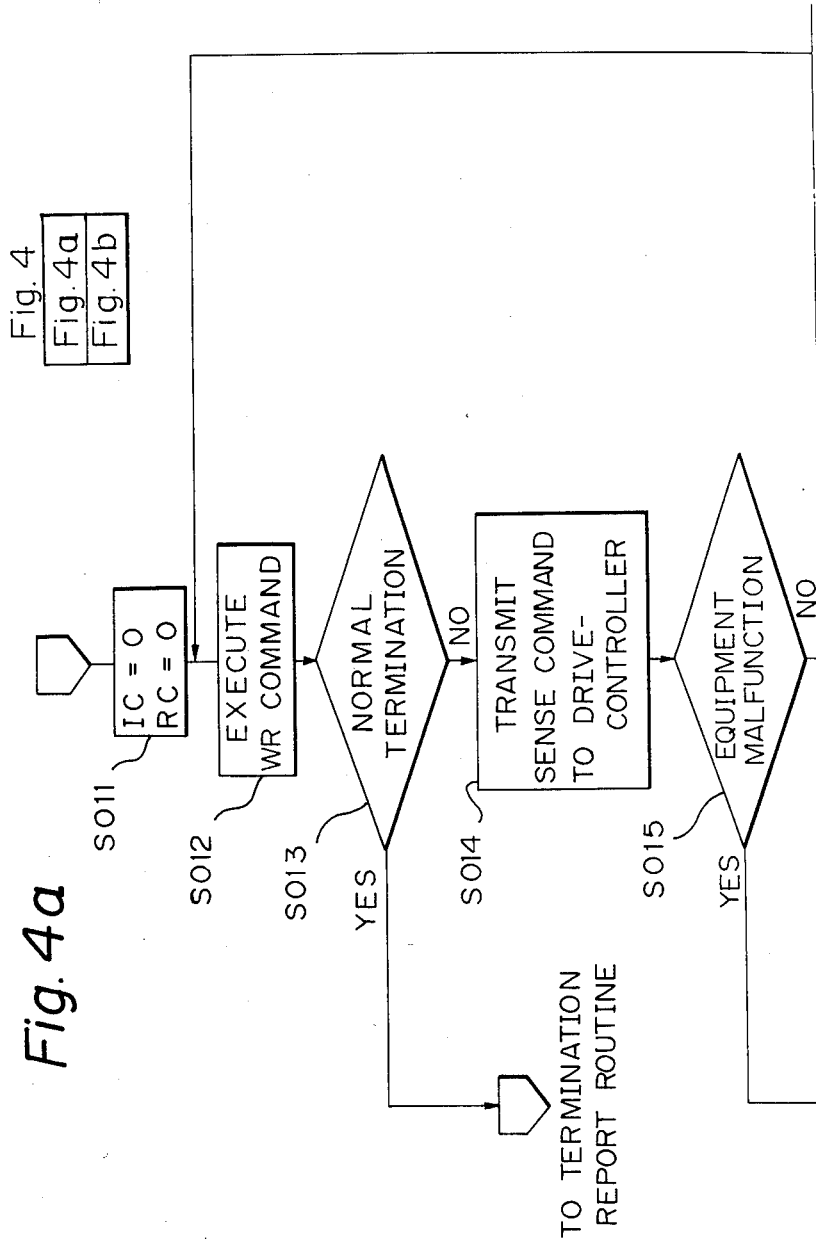

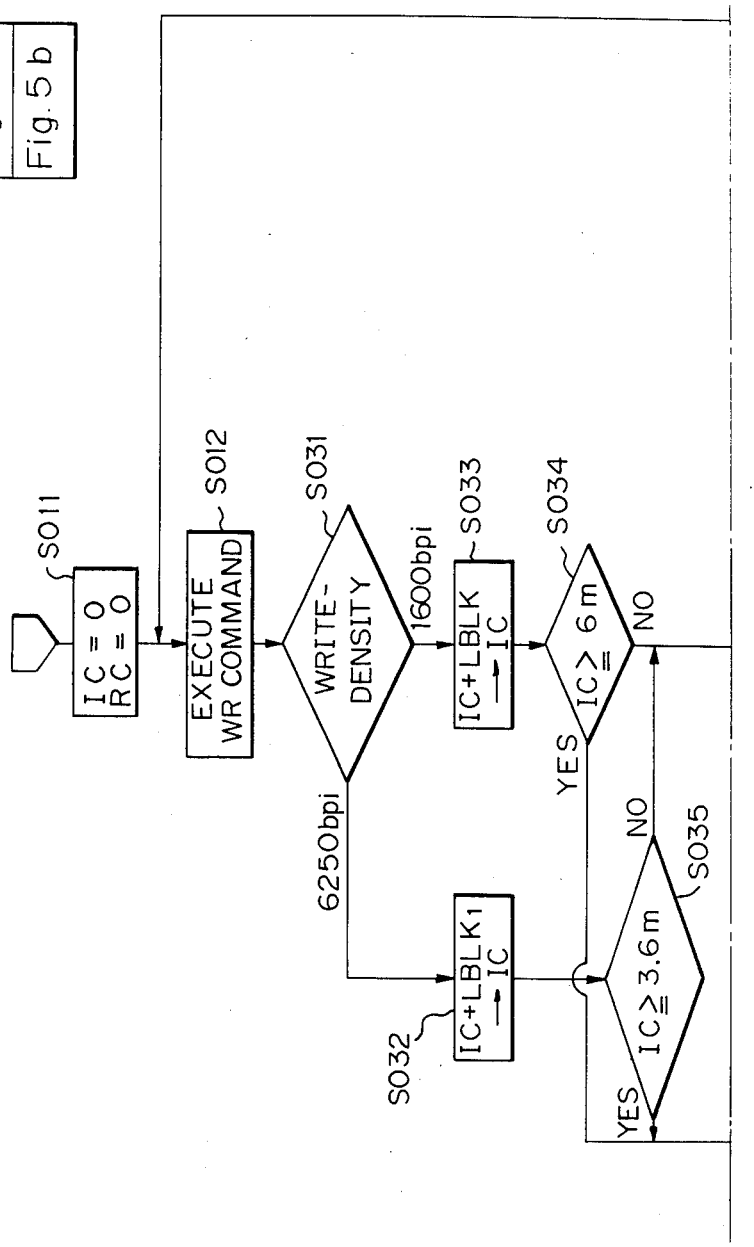

MAGNETIC TAPE SYSTEM WITH WRITE RETRY MEANS

BACKGROUND OF THE INVENTION

1. Field of the Invention

The present invention relates to a magnetic tape system. More particularly, the present invention relates to a magnetic tape system in which a write retry operation is automatically executed when a write error occurs.

2. Description of the Related Art

Magnetic tape systems are widely used as external memory devices in electronic computers. Recently, a magnetic tape system has been utilized for the backup operation of other memory devices, such as a magnetic disc device, having a short access time. In such a magnetic tape system, writing is effected in individual blocks and an interblock gap (IBG) is formed between adjacent blocks to separate each block. If a write error occurs while the data of one block is being written, the written block is a erased and re-writing, that is, write retry, is a executed. If write retry is controlled only by the retry frequency, however, in a so-called variable length block system where the erase block length is not constant, a problem of magnetic tape incompatibility arises. This problem is described in detail hereinafter.

SUMMARY OF THE INVENTION

It is an object of the present invention to provide a magnetic tape system in which write retry is executed according to the variable length erase method, wherein an excess of the IBG length caused by a write retry, beyond a predetermined value, is prevented and a compatible tape can be provided.

More specifically, in accordance with the present invention, there is provided a magnetic tape system having a driving unit including a magnetic head, reels having a magnetic tape wound thereon and a drive portion for driving the reels, a drive control unit operatively connected to the drive unit to control the drive unit, and a command and data control unit operatively connected to the drive control unit and a host controller for transmitting access commands to the magnetic tape. The access commands actuate the drive unit through the drive control unit according to the commands transmitted from the host controller and transmits the results of the operation to the host controller. The command and data control unit writes data of one block in length on magnetic tape according to write commands and data from the host controller, and detects the occurrence of an error in the write operation. If an error occurs, the written block is erased and the data from the host controller is rewritten in a block subsequent to the erased block. The command and data control unit integrates the length of blocks erased by rewriting, and if the erased block length in the magnetic tape exceeds a predetermined value, the above-mentioned rewriting operation is stopped. Furthermore, the command and data control unit can transmit an error signal to the host controller when the length of blocks erased by rewriting exceeds a predetermined value. Moreover, the command and data control unit can hold write data when the length of blocks erased by rewriting exceeds a predetermined value. Still further, the command and data control unit can carry out a rewriting operation at an erased block length determined according to the write density of the magnetic tape.

BRIEF DESCRIPTION OF THE DRAWINGS

Other objects and features of the present invention will become apparent from the following detailed description made with reference to the accompanying drawings, in which:

FIGS. 5a and 5b, are flow charts illustrating the write retry operation in the magnetic tape system shown in FIGS. 2 and 3.

DESCRIPTION OF THE PREFERRED EMBODIMENTS

Figure 1A:
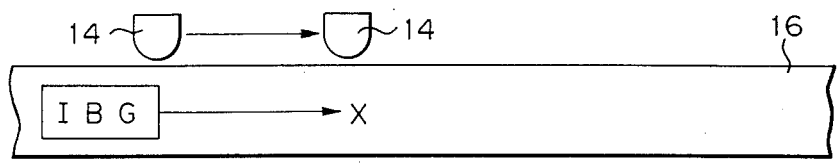
FIGS. 1a through 1e are diagrams illustrating the write retry operation according to the present invention.

Before explaining the preferred embodiments of the present invention, the write retry operation will be described with reference to FIGS. 1a through 1e.

In the following description, made with reference to FIGS. 1a through 1e, a magnetic head 14 is moved over a magnetic tape 16 for the write retry operation. This description, however, is only for facilitating the expression in the drawings and an understanding of the operation; in practice, a magnetic tape 16 is moved while the magnetic head 14 is fixed.

Generally, the magnetic head 14 performs a read operation after data storage from the rear end of the IBG of the magnetic tape 16, as shown in FIG. 1a, and checks the written data. When at the point X in FIG. 1a, it is detected that the written data is different from the read data, a write error is detected and a retry operation is executed.

Figure 1B:
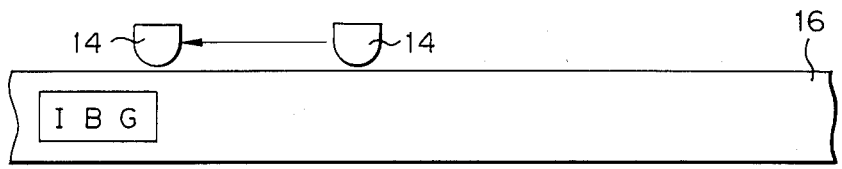
Figure 1C:
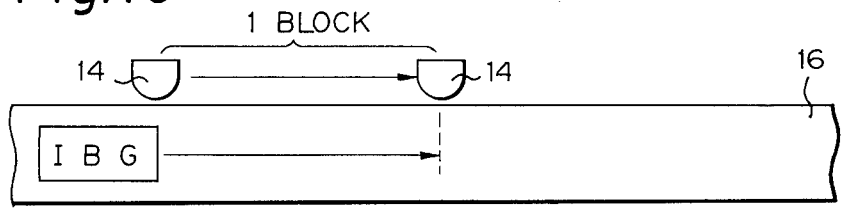

This retry operation is described below. First, as shown in FIG. 1b, the magnetic head 14 is backspaced (repositioned) to the rear end of the IBG of the magnetic tape 16. Then, as shown in FIG. 1c, the area of the corresponding block of the magnetic tape 16 is erased by the magnetic head 14. Furthermore, as shown in FIG. 1d, the erased area is designated as IBG1, and the content of the written block is written from the rear end of IBG1 by the magnetic head 14.

Figure 1D:
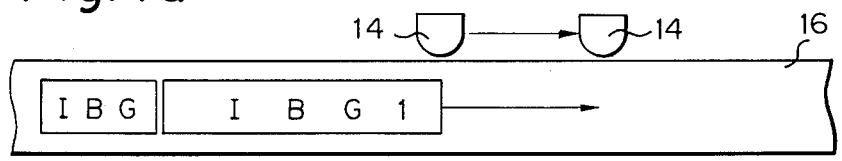
Figure 1E:
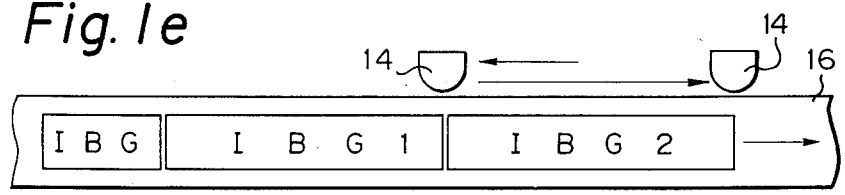

If a write error is again detected during the write retry operation shown in FIG. 1d, the magnetic tape 14 is again backspaced to the rear end IBG1 of the magnetic tape 16, as shown in FIGS. 1b through 1d, the area of the corresponding block is erased, and the writing operation is again executed from the rear end IBG2 (see FIG. 1e).

In this case, erasure is not performed at the error-occurring position on the magnetic tape 16 but for the area of one block of data. This is because, when erasing a fixed length (for example, erasing for 3 inches of tape), the error-occurring position will not be erased. Therefore, the above-mentioned erasing manner is adopted to ensure that the error-occurring position is properly erased. This erasing method is called "variable length erasing" because the area to be erased depends on the length of the block.

In this write retry operation, if the magnetic tape 16 is deteriorated and the write retry operation is repeated, a write error occurs and the normal writing operation is impossible. Accordingly, the frequency or number of the write retry operation for data of one block is limited, and if the frequency of the write retry operation exceeds a certain limit, it is judged that a tape error (tape use impossible) has occurred, and the write retry operation is not again performed. On the other hand, if writing of data in one block is successful within the above-mentioned limit of the frequency of the write retry operation and an error does not occur, termination of the normal operation is reported to a host controller.

In the case of a variable length block where the block length is not constant, if the write retry operation is limited only by the frequency or number, the disadvantages described below are incurred.

According to the International Standard Organization (ISO), the maximum length of an IBG is set as 7.6 m in the phase encoding (PE) system (1600 bits per inch) and as 4.5 m in the group coded recording (GCR) system (6250 bit per inch). In the conventional technique, since the write retry operation is limited by the frequency, in the case of a certain block length it is possible to exceed the maximum length of the IBG even if the frequency of the write retry operation is within the limit. For example, if one block has a length of 64 kilobytes, when the writing operation is performed according to the PE system, the block length on the magnetic tape 16 is about 1 m. Accordingly, if the write retry operation is performed 8 times within the limit of the frequency, the IBG exceeds the maximum length of 7.6 m.

Therefore, a magnetic tape 16 having an IBG exceeding the limitation of the IBG length determined by the ISO standard or the like is prepared, but there is no guarantee that this magnetic tape having an IBG exceeding the standard can be read out by a different tape system, and a problem arises concerning the compatibility of the magnetic tape.

Embodiments of the present invention will now be described.

Figure 2:
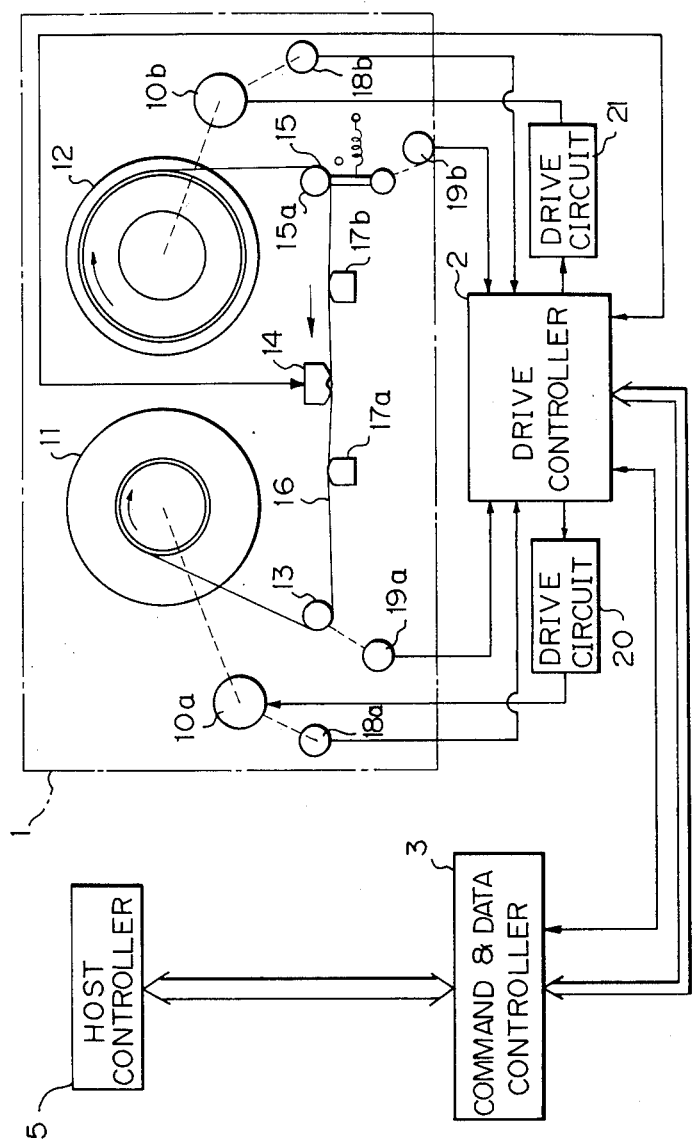
FIG. 2 is a schematic diagram illustrating a magnetic tape system according to one embodiment of the present invention.

FIG. 2 is a diagram of the structure of a magnetic tape system according to one embodiment of the present invention. Reference numeral 1 represents a magnetic tape drive unit (hereinafter referred to as "drive") of a direct reel-to-reel drive system, which is constructed so that a magnetic tape 16 travels between a take-up reel (machine reel) 11 and a feed reel (file reel) 12 and is wound on the take-up reel 11 through a roller 15a of a tension arm 15, a magnetic head 14, and an idler 13. The magnetic tape 16 is guided by guides 17a and 17b on both sides of the magnetic head 14. The take-up reel 11 and the feed reel 12 are rotated and driven by drive motors 10a and 10b, respectively. Rotary encoders 18a and 18b are mounted on the drive motors 10a and 10b to detect the number of rotations of the drive motors 10a and 10b. A rotary encoder 19a is mounted on the idler 13 to make it possible to determine the actual travelling position of the tape, and a tension detector 19b is mounted on the tension arm 15 to enable detection of the tape tension.

Reference numeral 2 represents a drive controller for driving and moving the tape and driving the head for writing or reading according to commands and data transmitted from a command and data controller described hereinafter. The drive controller 2 receives outputs from the respective rotary encoders 18a, 18b and 19a to determine the state of travel of the tape and receives the output from the tension detector 19b to check the tension of the tape. Furthermore, the drive controller 2 controls both the drive motors 10a and 10b through drive circuits 20 and 21. Thus, the drive controller 2 drives and moves the tape under a constant tape tension, transmits data to be written to the magnetic head 14 to effect writing and receives data read by the magnetic head 14.

Reference numeral 3 represents a command and data controller which receives write commands or read commands from the host controller and accumulates written data therein. In the case of a write command, the command and data controller 3 transmits a write command and data to be written to the drive controller 2 to effect the writing operation, and if the operation is normally terminated, the command and data controller 3 informs the host controller of this normal termination. If the operation is not normally terminated, the command and data controller 3 causes the drive controller 2 to effect the write retry operation.

The control means is comprised of the command and data controller 3 and the drive controller 2, and the command and data controller 3 acts as a magnetic tape device to the host controller and as a host controller to the drive controller 2.

Figure 3:
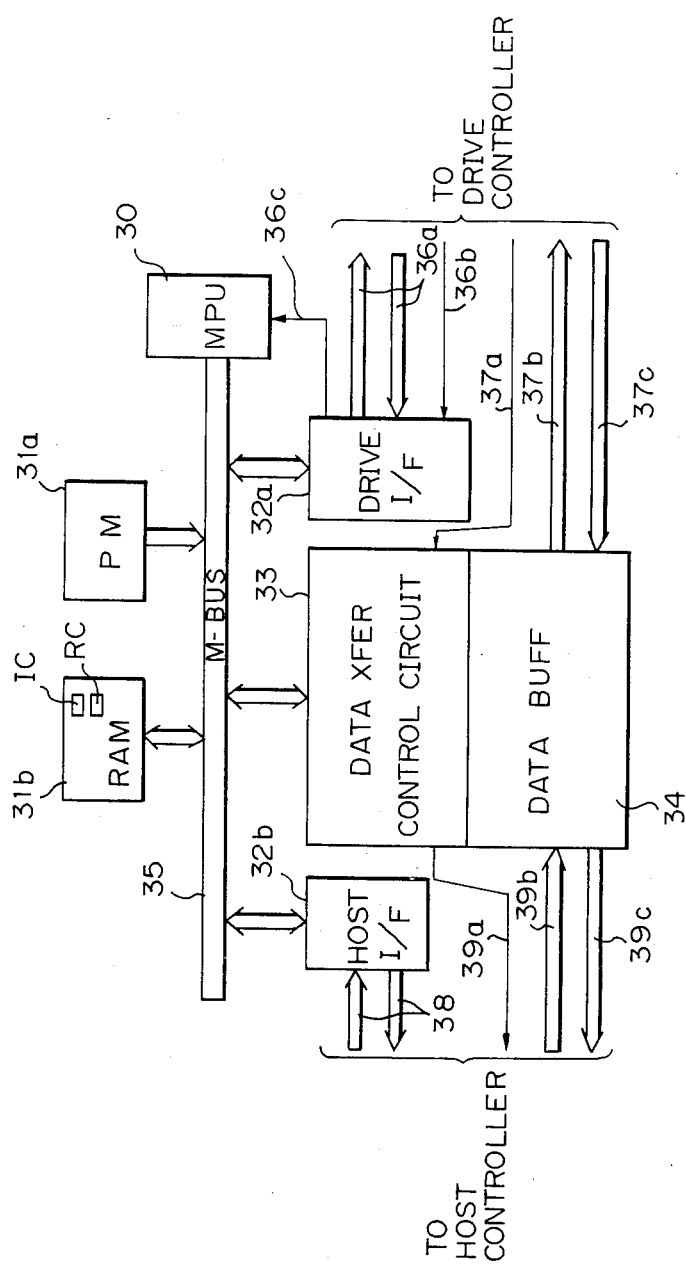
FIG. 3 is a schematic diagram illustrating a command and data control unit in the embodiment shown in FIG. 2.

FIG. 3 is a diagram illustrating the command and data controller 3 in the system shown in FIG. 2. In FIG. 3, reference numeral 30 represents a micro-processor (hereinafter referred to as "MPU"), which performs control of the receipt of commands and data from the host controller and control of the transmission of data and status according to a micro-program of a program memory, and also performs control of the transmission of commands and data to the drive controller 2 and control of the receipt of data and status from the drive controller 2. Moreover, the micro-processor 30 performs the processing of a retry control. Reference numeral 31a represents a program memory in which programs to be executed by the MPU 30 are stored. Reference numeral 31b represents a random access memory (hereinafter referred to as "RAM"), in which data, commands, and parameters necessary for the MPU 30 processing are stored. In this embodiment, the RAM 31b has a retry count area RC for writing the frequency or number of the retry operations and an IBG count area IC for writing the IBG length. Reference numeral 32a represents a drive interface circuit for the transfer of control signals and the like between the drive controller 2 and the command and data controller 3. Reference numeral 32b represents a host interface circuit for the transfer of control signals and the like between the host controller and the command and data controller 3. Reference numeral 33 represents a data transfer control circuit for controlling a data buffer, described hereinafter, to control the transfer of data between the host controller or the drive controller 2 and the command and data controller 3. The control circuit 33 transmits a data transfer demand signal to the host controller and receives a data transfer demand signal from the drive controller 2 to execute control of the data transfer. Reference numeral 34 represents a data buffer controlled by the data transfer control circuit 33. The data buffer 34 stores the data to be stored from the host controller and transfers the stored data to the drive controller 2. The buffer 34 also stores the data read from the drive controller 2 and transfers the read data to the host controller. The data buffer 34 has, for example, a storage capacity of 256 kilobytes. Reference numeral 35 represents a data bus for connecting the MPU 30 to the program memory 31a, RAM 31b, drive interface circuit 32a, host interface circuit 32b, and data transfer control circuit 33 to execute the transfer of commands and data.

Reference numeral 36a represents a control signal line used to transmit commands to the drive controller 2 and receive status and the like from the drive controller 2. Reference numeral 36b represents a line for a signal showing a detection of a region adjacent to the tape end, which is used for transmitting this signal from the drive controller 2. Reference numeral 36c represents an interruption line which is used for informing the MPU 30 of an interruption from the drive interface circuit 32a. Reference numeral 37a represents a data transfer demand signal line for transmitting a data transfer demand signal to the data transfer control circuit 33 from the drive controller 2. Reference numeral 37b represents a store data bus used for transmitting the stored data to the drive controller 2 from the data buffer 34. Reference numeral 37c represents a read data bus used for transmitting the read data to the data buffer 34 from the drive controller 2. Reference numeral 38 represents a control signal line used for the transfer of commands and status between the host controller and the command and data controller 3. Reference numeral 39a represents a data transfer demand signal line used for transmitting a data transfer demand signal to the host controller. Reference numeral 39b represents a store data bus used for transmitting the stored data from the host controller to the data buffer 34. Reference numeral 39c represents a read data bus used for transmitting the read data to the host controller from the data buffer 34.

The MPU 30 executes storing and reading among RAM 31b, the host interface circuit 32b, the drive interface circuit 32a, and the data transfer control circuit 33 through the data bus 35 to perform the desired processing. More specifically, the host interface circuit 32b performs the transfer of commands and status by the control of the MPU 30 through the host controller and the control signal line 38, and the drive interface circuit 32a performs the transfer of commands and status by the control of the MPU 30 through the drive controller 2 and the control signal line 36a. According to the instructions from the MPU 30, the data transfer control circuit 33 transmits a data transfer demand to the host controller through the data transfer demand signal line 39a, and on receipt of this signal, the host controller transmits the stored data to the data buffer 34 through the store data bus 39b and the stored data is accumulated in the data buffer 34. The data transfer demand transmitted through the data transfer demand signal line 37a from the drive controller 2 causes the data transfer control circuit 33 to transmit the stored data of the data buffer 34 to the drive controller 2 through the stored data bus 37b.

Furthermore, the instructions from the MPU 30, cause the data transfer control circuit 33 to accumulate the read data transmitted from the drive controller 2 through the read data bus 37c in the data buffer 34 and to transmit the read data of the data buffer 34 to the host controller through the read data bus 39c.

FIG. 4 is a flow chart illustrating the processing in one embodiment of the present invention.

The operation of receiving commands and data from the host controller is described below.

The command (writing or reading) from the host controller is given to the host interface circuit 32b through the control signal line 38, the MPU 30 reads out the command through the data bus 35 and recognizes the content of the command, and the recognized command is stored in the command store area. If the command is a write command, MPU 30 transmits a write address to the data transfer control circuit 33 and a data transfer demand is transmitted to the host controller from the data transfer demand signal line 39a. The MPU 30 receives the data to be written from the host controller through the stored data bus 39b, and the data to be written is stored in the instructed store address of the data buffer 34.

Figure 4B:
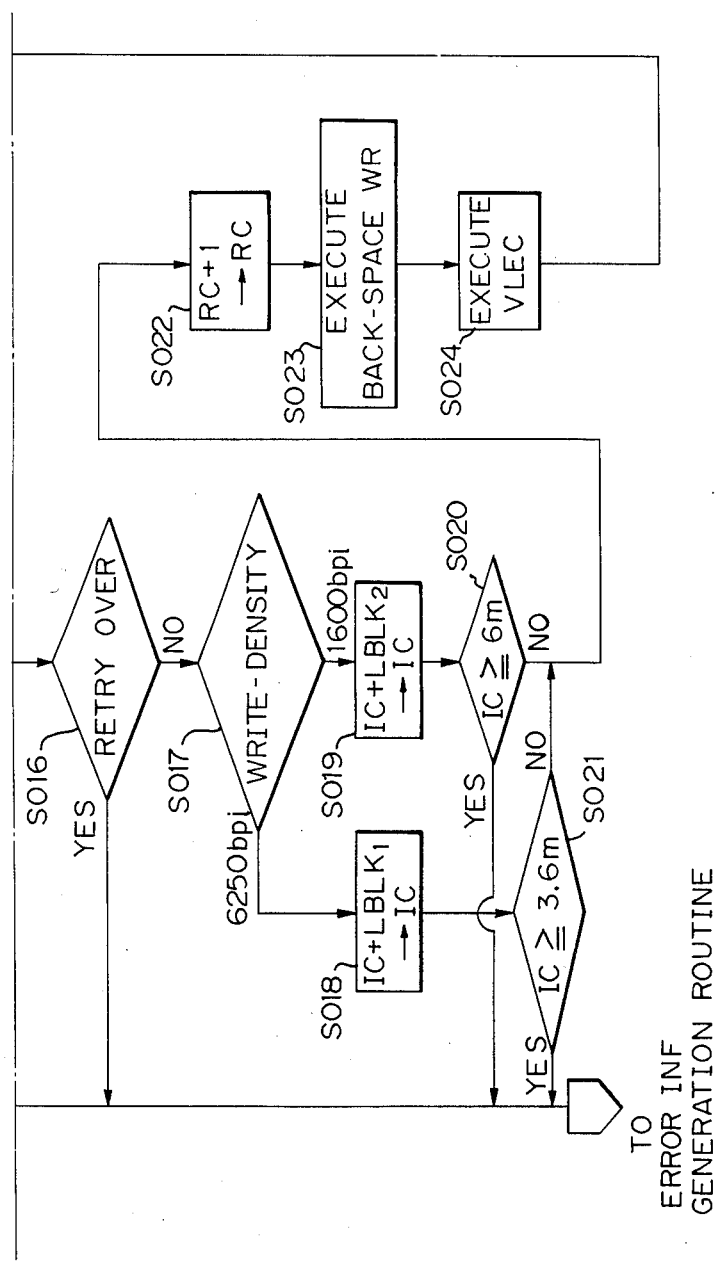
FIGS. 4, including FIGS. 4a and 4b, and 5, including

When the MPU 30 receives the termination report from the drive controller 2, the MPU 30 analyzes the command stored in the command store area of the RAM 31b, and if the command is a write command, processing of the write command is performed according to the routine shown in FIGS. 4a and 4b, which is explained as follows.

Step S011

The MPU 30 clears the IBG count area Ic and retry count area RC of the RAM 31b to zero.

Step S012

The write command is transmitted to the drive controller 2 through the drive interface circuit 32a and the control signal line 36 to actuate the drive controller 2, and a response signal (data busy) from the drive controller 2 is received through the drive interface circuit 32a to start an automatic transfer. More specifically, the MPU 30 transmits the address of the written data corresponding to the write command in the data buffer 34 as the load address, and the byte number of the written data corresponding to the write command as the load byte count value, to the data transfer control circuit 33 to prepare for an automatic transfer. On receipt of the data transfer demand signal from the drive controller 2, the data transfer control circuit 33 sends the written data to the drive controller 2 from the data buffer 34 through the store data bus 37b, whereby the drive controller 2 starts the travelling of the magnetic tape 16 and the writing of the data written on the magnetic tape 16 is performed by the magnetic head 14 while the written content is also read out by the magnetic head 14 to accomplish the read-after-write checking.

If execution of the write command by the drive controller 2 is normally terminated, a normal termination report is sent to the MPU 30 from the control signal line 36a through the drive interface circuit 32a, but if an error has occurred, an abnormal report is similarly sent to MPU 30.

Step S013

The MPU 30 analyzes the content of the information received, and in the case of a normal termination, the routine goes to a termination report routine and the corresponding write command of the command write area of RAM 31b and the write data of the data buffer are invalidated and a normal termination report is sent to the host controller through the host interface circuit 32b.

Step S014

In the case of an abnormal report, the MPU 30 transmits a sense command to the drive controller 2 through the drive interface circuit 32a and determines the content or type of the abnormality (error) of the drive controller 2.

In response to this inquiry, the drive controller 2 informs the drive interface circuit 32a of the content of the error through the control signal line 36a.

Step S015

The MPU 30 analyzes the content of the error, and if the error is a system error (impossible to block write or read or improper travelling speed of the tape), the routine goes immediately to an error information forming routine. The operation is stopped, and the termination because of an abnormality is reported to the host controller through the host interface circuit 32b.

Step S016

If the error is a write error (data check error), the MPU 30 checks the content of the retry count area RC of the RAM 31b, and a check is made to determine whether the retry frequency or number has exceeded the predetermined value (excessive retry).

In case of an excessive retry, as in the above-mentioned case of a system error, the routine goes to the error information forming routine, the operation is stopped, and termination of the abnormality is reported to the host controller.

Steps S017 through S020

If the retry frequency does not exceed the predetermined value (not excessive retry), the MPU 30 determines whether the set write density is 1600 bpi or 6250 bpi, and the block length (byte number, $LBLK_1$ or $LBLK_2$) of the write data, which differs according to the write density, is added to the content of the IBG length area IC of the RAM 31b to renew the content of the IBG length area IC. If the write density is 1600 bpi, it is determined whether the content of the IBG length area IC exceeds the length limit (6 m), and if the write density is 6250 bpi, it is determined whether or not the content of the IBG length area IC exceeds the length limit (3.6 m). The limit length is shorter than the maximum length specified by ISO because errors in the travelling speed of the tape are taken into consideration.

If the content of the IBG length area IC exceeds the length limit, the routine goes to the error information forming routine, the operation is stopped, and termination of the abnormality is reported to the host controller.

Steps S022 through S024

If the content of the IBG length area IC does not exceed the limit length, the retry operation is allowed.

At first, 1 is added to the content of the retry count area RC of RAM 31b to renew the content of the retry count area RC. Then, the MPU 30 transmits a backspace command to the drive controller 2 from the drive interface circuit 32a through the control signal line 36a, and the drive controller 2 then feeds the magnetic tape 16 backward and backspaces the tape 16 as shown in FIG. 1b.

Furthermore, the MPU 30 transmits a variable length erase command VLEC to the drive controller 2 from the drive interface circuit 32a through the control signal line 36a. By this command VLEC, the drive controller 2 is caused to feed the magnetic tape 16 block by block in the normal direction, as shown in FIG. 1c, and to drive the magnetic head 14 to effect the erasing operation.

Prior to transmission of the variable length erase command VLEC, as in the case of the write command, the byte count value is transmitted to the data transfer control circuit 33 to prepare for an automatic transfer. The variable length erase command is accompanied by the data transfer operation as well as the write command, but the written data has no particular significance. The routine then returns to step S012, and the MPU 30 again executes the writing operation.

If the write retry operation is thus executed and the retry frequency exceeds the limit, the operation is stopped (excessive retry). Even if the retry frequency is within the limited value, if the erase block length (IBG length) exceeds the length limit, this is judged to be a tape error (tape abnormality) and the operation is stopped.

In the present embodiment, before erasing, the block length to be eliminated is added to the IBG length, and the IBG length is then determined. Accordingly, the write error-occurring block is left on the tape 16 ad is used for subsequent analysis of the error. Moreover, an unnecessary retry operation need not be performed.

Figure 5B:
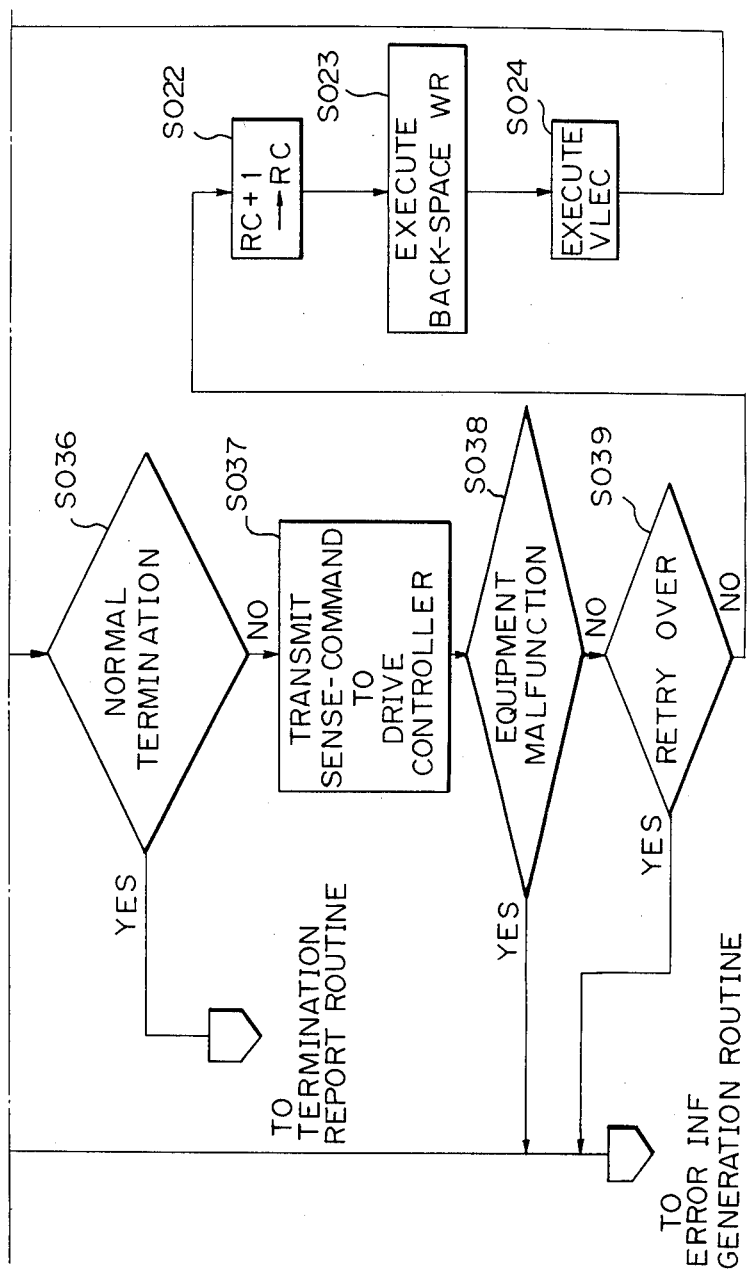

FIG. 5 is a flow chart of the processing in another embodiment of the present invention. In this embodiment, the order of steps S013 through S016 and S017 through S021 in FIG. 4 is changed to steps S031 through S035 and S036 through S039, and after execution of the write command at step S012, steps S031 through S035 for determining the IBG length are inserted. In this embodiment, the actual erase length is added to the IBG length and the value obtained thereby is subjected to a determination. Additionally, the written data is left on the tape 16 and is used for subsequent analysis of the error.

The principle of the present invention adopted in the foregoing embodiments is described below with reference to FIGS. 6 and 7.

Figure 6:
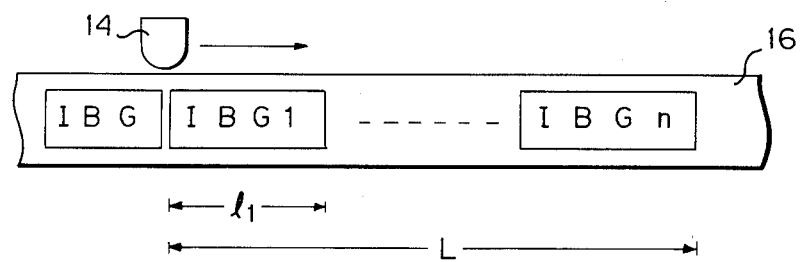
FIGS. 6 and 7 are diagrams illustrating the principle of the present invention.
Figure 7:
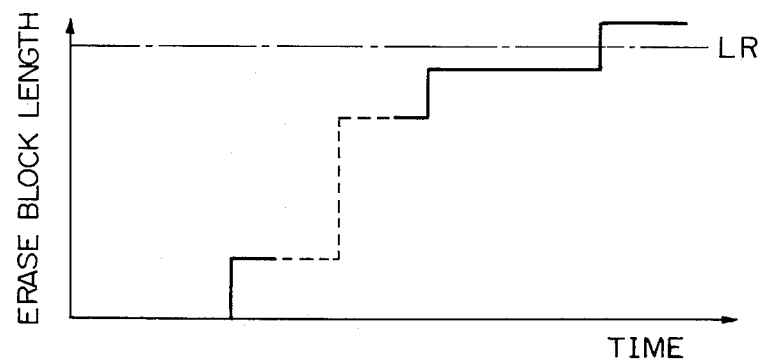

Upon writing one block, as shown in FIG. 6, the erase length l1 by the write retry is performed at every write retry to obtain an integrated value L. As shown in FIG. 7, the erase block length L is compared with the predetermined length LR, and if the erase block length L exceeds the predetermined length LR, it is judged that a tape error has occurred and a further retry is inhibited.

As is apparent from the foregoing description, according to the present invention, lengths of erased blocks are integrated and it is determined whether or not the integrated value exceeds the predetermined length. Accordingly, the formation of a magnetic tape having a write content in which the IBG length exceeds the standard value can be prevented, tape compatibility can be maintained, and writing outside the range specified by the ISO standard can be prevented.

Moreover, the present invention can be easily realized, and the present invention provides excellent practical effects.

Many widely different embodiments of the present invention may be constructed without departing from the spirit and scope of the present invention. It should be understood that the present invention is not limited to the specific embodiments described in this specification, except as defined in the appended claims.

We claim:

1. A magnetic tape system for use in conjunction with a host controller, comprising:

a magnetic head;

first and second reels;

drive means for rotationally driving said reels;

magnetic tape wound on said reels and moving past said magnetic head by said drive means;

drive control, operatively connected to said drive means, for controlling said drive means;

detection means for detecting write operation errors; and command and data control means, operatively connected to said drive control means and said host controller, for writing data blocks of various lengths on said magnetic tape and for feeding access instructions to said magnetic tape to operate said drive means via said drive control means according to instructions from said host controller and to report results of said operation to said host controller, said command and data control means writing blocks of data on said magnetic tape according to write commands and data from said host controller and when an error occurring during the writing of one of said blocks is detected, erasing the block of data containing the error, rewriting the write commands and data corresponding to said block of data containing the error at a position subsequent to and erased block, and adding and storing an amount equal to the lengths of all blocks erased to achieve a total erased-block length value, and when the total erased-block length value of said magnetic tape exceeds a predetermined value, said re-writing is stopped.

2. A magnetic tape system as set forth in claim 1, wherein when the total erased block length of said magnetic tape exceeds the predetermined value, an error signal is transmitted to said host controller.

3. A magnetic tape system as set forth in claim 2, wherein when the total erased block length of said magnetic tape exceeds the predetermined value, the written data is maintained.

4. A magnetic tape system as set forth in claim 3, wherein the total erased block length of said magnetic tape is determined according to a write density of said magnetic tape.

5. A magnetic tape system, comprising:

magnetic tape for storing blocks of data of various lengths;

write means for performing a write operation in which data is written on said magnetic tape;

erase means for performing an erase operation in which data is erased from said magnetic tape;

error detection means for detecting blocks containing write errors;

adding and storing means for adding a total amount of tape erased by said erase means by summing the length of blocks containing write errors and an intergap block length; and drive means for moving said tape past said write means and said erase means, said error detecting means, upon detecting a write error in a data block written on said magnetic tape by said write means, causing said drive means to back-up said magnetic tape, said erase means erasing the data block containing the error while said adding means simultanesouly adds and stores an amount equal to the length of the data error, and the write means re-writing the data corresponding to the data block containing the error on the tape beginning from a position subsequent to the position at which the error was detected.

6. A magnetic tape system according to claim 5 and further comprising means for terminating said write operation, wherein when the amount stored by said adding and storing means reaches a predetermined amount, said write operation is terminated.

7. A magnetic tape system, comprising:

taping means for moving a magnetic tape and for writing and erasing data blocks of various lengths on said magnetic tape; and control means for detecting blocks of data containing errors on said magnetic tape and controlling said taping means to backup said magnetic tape, erase said blocks containing errors, and rewrite the data contained in said blocks containing errors on a portion of said magnetic tape subsequent to the position at which the error was detected.

8. A magnetic tape system as recited in claim 7, said control means further comprising adding means for adding and storing an amount equal to the length of the data blocks containing errors.

9. A magnetic tape system as recited in claim 8, said control means further comprising termination means for terminating said rewriting of data when the amount stored by said adding and storing means reaches a predetermined amount.

* * * * *

UNITED STATES PATENT AND TRADEMARK OFFICE
CERTIFICATE OF CORRECTION

PATENT NO. : 4,783,784

DATED : November 8, 1988

INVENTOR(S) : Ishiguro et al.

It is certified that error appears in the above-identified patent and that said Letters Patent is hereby corrected as shown below:

Front Page [57] ABSTRACT, line 9, "information" should be --formation--.

Col. 8, line 22, "ad" should be --and--;

Col. 8, line 41, "11" should be -- $\ell 1$--.

Signed and Sealed this

Eighteenth Day of April, 1989

Attest:

DONALD J. QUIGG

Attesting Officer     Commissioner of Patents and Trademarks